United States Patent Office 3,280,089
Patented Oct. 18, 1966

3,280,089
SUSPENSION POLYMERIZATION OF STYRENE IN PRESENCE OF HYDROXYETHYL CELLULOSE AND WATER-SOLUBLE CHROMATE SALT
Harold A. Wright, Murrysville, Pa., assignor to Koppers Company, Inc., a corporation of Delaware
No Drawing. Filed Dec. 5, 1963, Ser. No. 328,187
2 Claims. (Cl. 260—93.5)

This invention relates to a method of preventing the occurrence of a simultaneous emulsion polymerization within a suspension polymerization system.

A preferred technique frequently used for the conversion of unsaturated organic compounds such as styrene and styrene mixtures to their corresponding polymers is suspension polymerization. In general, suspension polymerization contemplates the formation of an aqueous dispersion of a polymerizable monomer to ultimately produce bead-shaped or granular-shaped polymeric materials. In a suspension polymerization process, the dispersion of the monomer or mixtures thereof in the aqueous phase is maintained by agitation and by the addition of a suspending agent such as a water-soluble, macro-molecular compound, e.g., hydroxyethyl cellulose. Dispersing agents or suspending agents augment the strong agitation to keep the globules of monomer completely dispersed during the entire suspension polymerization reaction.

The above-described suspension polymerization system using, for example, hydroxyethyl cellulose as a suspending agent has been used successfully to polymerize such monomers as styrene and styrene-synthetic rubber mixtures (impact-resistant polystyrene). It is now known, however, that the hydroxyethyl cellulose suspending system is not completely satisfactory. For example, the preparation of high-impact suspension-polymerized polystyrene or suspension-polymerized normal polystyrene is generally accompanied by the formation of an opaque serum, i.e., fine polymer particles dispersed in water, forming what is commonly called "white water," the solids content of which cannot be readily separated by filtration. The formation of this opaque milky serum accounts for a product loss in the suspension system as well as creating a serious effluents disposal problem. The formation of this white water is attributed to a simultaneous emulsion polymerization of styrene during the suspension polymerization reaction.

A normal emulsion polymerization system operates by polymerization of monomer solubilized within soap micelles. Although hydroxyethyl cellulose is not a soap, it is akin to the polyethylene oxide-alkylphenol family of non-ionic surface active agents. In hydroxyethyl cellulose, polyethylene oxide chains (usually of 1–3 ethylene oxide units in length) are attached to each anhydroglucose portion of the cellulose molecule. Because the said polyethylene oxide-alkylphenols have been shown to exert some micelle action, and in fact can promote emulsion-type polymerization, obviously hydroxyethyl cellulose also can create a limited supply of micelles, thus leading to some emulsion polymerization.

In practice, suspension polymerization is known to exist in two phases, namely, an oil or organic phase and a water phase. The water phase is considered to be a continuous phase during the entire suspension polymerization whereas the oil phase is considered to be discontinuous because immediately upon the stirring or agitation at the beginning of the polymerization reaction, the oil phase is made up of individual oil droplets. These droplets are surrounded by the continuous water phase. The oil phase contains, substantially, the monomer or monomers plus the initiators and other additives used during the polymerization. A minor proportion of the initiators having some slight solubility in water, may thus be contained in the water phase; and it is the presence of these minute quantities of initiator in the water phase of a suspension polymerization system which is responsible, together with the hydroxyethyl cellulose, for the formation of emulsion-type polymer particles in the water phase, thus accounting for the milky-white or opaque appearance of the water phase at termination of suspension polymerization.

The milky-white appearance of the water phase is a definite indication that an emulsion polymerization of styrene or mixtures of styrene and synthetic rubbers, and the like, has occurred in the water phase.

As is well-known, the essential step in the polymerization of styrene and mixtures of styrene is the initiation act or the creation of an active center. The initiation and formation of these active centers is generally accomplished by the use of free-radical-generating "catalysts" in the suspension polymerization system. These catalysts or initiators must be as nearly water-insoluble and oil (styrene, etc)-soluble as possible to assure a complete suspension-polymerization reaction. Typical catalysts which may be used are, for example, dicumyl peroxide, benzoyl peroxide, t-butyl perbenzoate, and lauroyl peroxide. Combinations of initiators are also used which have different half-life temperatures so as to obtain a maximum amount of polymerization in the shortest possible time.

The initiators used in suspension polymerization are substantially completely contained within the monomer or oil phase of the suspension polymerization. However, complete retention of these initiators in the oil phase has never been obtained. Therefore, minute quantities of initiator occur in the water phase of the suspension polymerization system. Consequently, emulsion polymerization can easily be initiated by the catalyst, contained in the water phase, in the "micelles" of the suspending agent. The presence of even small quantities of emulsion causes an effluents disposal problem as well as waste of whatever styrene is polymerized during the emulsion polymerization. Additionally fibrous contaminant is formed due to coagulation of the semi-stable emulsion polymer, said fibrous contaminant being difficult to remove from the prime solids thus downgrading the end product as well as causing loss of original styrene charge.

I have now found that styrene and mixtures of styrene and other monomers copolymerizable with styrene in a suspension polymerization system, using as a suspending agent hydroxyethyl cellulose, may be suspension-polymerized in the absence of a simultaneous emulsion polymerization. The occurrence of a simultaneous emulsion polymerization within a suspension polymerization system is prevented by the addition to the suspension of small quantities of water-soluble chromate and dichromate salt, hereinafter referred to as chromate salt.

The presence in a suspension polymerization system of such a chromate salt prevents the emulsion polymerization in the water phase, while at the same time, having little or no effect upon the suspension polymerization within the oil phase. Since the chromate salt is insoluble in the oil phase, the chromate salt cannot appreciably affect the polymerization within the oil phase; but because the chromate salt is water soluble, it will prevent emulsion polymerization within the water phase. Thus a chain-initiated reaction will not occur in the water phase.

The amount of water-soluble chromate salt effectively used in the practice of this invention is dependent upon the amount of hydroxyethyl cellulose suspending agent used in the suspension polymerization process. A ratio of hydroxyethyl cellulose-to-chromate salt (weight basis)

of from 10:1–100:1 has been found to be useful in the practice of this invention. A range of from 30:1–60:1 is preferred. At hydroxyethyl cellulose chromate salt ratios above 100:1 emulsion is formed whereas at ratios below 10:1 no further improvement in emulsion prevention is obtained.

Chromate salts useful in the practice of my invention are those which are water-soluble and preferably those of the alkali metals, ammonium, calcium and magnesium. Examples of such salts are sodium chromate, potassium chromate, ammonium chromate, potassium dichromate, calcium, chromate, magnesium chromate, and the like.

In conducting the suspension polymerization, the chromate salt can be added to the aqueous phase prior to the introduction of the monomer-initiator oil phase. It is necessary, however, that the chromate salt be contained within the aqueous phase of the suspension prior to the introduction of the hydroxyethyl cellulose so that no emulsification of monomer can occur. This is necessary because if emulsification of the monomer phase occurs while polymerization is in progress a certain amount of said emulsified monomer phase will be converted to polymer in emulsion form. Therefore, if the chromate salt is introduced subsequent to the introduction of the hydroxyethyl cellulose, some of the undesirable emulsion will have already formed.

The presence of the water-soluble chromate salt, as used in this invention, does not affect the general polymerization conditions which normally occur in the suspension polymerization system. For example, in the suspension polymerization of styrene the amount of initiator used will generally range from 0.1–0.4 part per 100 parts styrene. Generally polymerization temperatures will be between 70° and 150° C. depending upon the type of product desired and on the initiator used.

The oil or hydrocarbon phase may contain blowing agents, comonomers including a synthetic rubber, plasticizers, lubricants, self-extinguishing agents, polymers, and copolymers which do not interfere with the suspension system.

The invention is further illustrated by way of the following examples.

*Example I*

Several polymerization experiments were performed under similar conditions except for the presence or absence of a chromate salt, the kind and amount of chromate salt, and the amount of hydroxyethyl cellulose.

In each of the experiments, styrene was polymerized in a suspension system containing:

| | Parts by weight |
|---|---|
| Styrene | 100 |
| Benzoyl peroxide | 0.30 |
| t-Butyl perbenzoate | 0.05 |
| Water | 100 |
| Hydroxyethyl cellulose | 0.15–0.90 |
| Water-soluble chromate salt (parts varied from 0 to 0.02). | |

The peroxide-type initiators were dissolved in the styrene monomer. The aqueous phase containing all other ingredients was prepared and the two phases were added to a two-liter resin kettle reaction flask and then agitated while maintained at 90° C. for six hours and then the hard-bead slurry was transferred to crown-capped bottles for further polymerization at 115° C. for four hours. After completion of polymerization, the suspended beads were removed from the bottles and the serum and fiber contents of the bottles were observed. Table I lists the results of these experiments.

TABLE I

| HEC [1] Parts/100 Styrene | Water-Soluble Chromate | | Ratio of HEC to Chromate | Results | |
|---|---|---|---|---|---|
| | Identity | Parts/100 Styrene | | Emulsion | Fibers |
| 0.30 | | Nil | | Gross | Gross. |
| 0.30 | Na$_2$CrO$_4$ | 0.0025 | 120:1 | Moderate | Moderate. |
| 0.30 | Na$_2$CrO$_4$ | 0.0037 | 80:1 | Slight | Few. |
| 0.30 | Na$_2$CrO$_4$ | 0.0050 | 60:1 | Nil | Nil. |
| 0.30 | Na$_2$CrO$_4$ | 0.010 | 30:1 | Nil | Nil. |
| 0.30 | Na$_2$CrO$_4$ | 0.020 | 15:1 | Nil | Nil. |
| 0.60 | Na$_2$CrO$_4$ | 0.0050 | 120:1 | Moderate | Moderate. |
| 0.60 | Na$_2$CrO$_4$ | 0.010 | 60:1 | Trace | Trace. |
| 0.90 | Na$_2$CrO$_4$ | 0.015 | 60:1 | Trace | Trace. |
| 0.15 | | Nil | | Gross | Gross. |
| 0.15 | Na$_2$CrO$_4$ | 0.0025 | 60:1 | Nil | Nil. |
| 0.25 | Na$_2$CrO$_4$ | 0.0050 | 50:1 | Trace | Nil. |
| 0.25 | Na$_2$CrO$_4$ | 0.010 | 25:1 | Nil | Nil. |
| 0.30 | K$_2$CrO$_4$ | 0.0050 | 60:1 | Trace | Nil. |
| 0.30 | K$_2$Cr$_2$O$_7$ | 0.0025 | 120:1 | Slight | Few. |
| 0.30 | K$_2$Cr$_2$O$_7$ | 0.0050 | 60:1 | Trace | Nil. |
| 0.30 | K$_2$Cr$_2$O$_7$ | 0.010 | 30:1 | Nil | Nil. |
| 0.30 | (NH$_4$)$_2$CrO$_4$ | 0.0050 | 60:1 | Nil | Nil. |

[1] HEC=Hydroxyethyl Cellulose.

*Example II*

The procedure of Example I was followed except that styrene was polymerized in the presence of a comonomer, diallyl itaconate. The results obtained using the additives of Example I were identical. In the presence of the desired range of chromate salt, no emulsion or fibers were formed and a clear liquid was visible.

*Example III*

The procedure of Example I was followed except that styrene was polymerized in the presence of a synthetic rubber (GR–S1503). The results obtained using the additives of Example I were identical.

The results obtained from the above-described experiments clearly indicate the unique, desirable effect obtained in a suspension polymerization system by the addition to said system of a water-soluble chromate salt to obviate a serious effluent problem, as well as to yield superior prime polymer.

The present invention provides a novel method for providing a suspension polymerization system which is particularly adapted to overcome the problem of effluents disposal created by a simultaneous emulsion polymerization during a suspension polymerization reaction. Furthermore, said elimination of emulsion polymer prevents the formation of undesirable fibrous contaminant among the prime product.

I claim:

1. A process comprising polymerizing styrene in aqueous suspension in the presence of hydroxyethyl cellulose as the suspending agent and a free radical generating catalyst as the initiator, a small amount of which is present in the aqueous phase, and adding a water-soluble chromate salt of alkali metal, ammonium, calcium, and magnesium to said polymerization reaction system in a ratio of hydroxyethyl cellulose to salt, by weight, of from 10:1–100:1.

2. The process of claim 2 wherein said styrene is a comonomer with other copolymerizable monomers.

References Cited by the Examiner
UNITED STATES PATENTS 2,666,047 1/1954 Koch _____ 260—92.8
2,769,788 11/1956 Craven et al. _____ 260—93.5

JOSEPH L. SCHOFER, *Primary Examiner.*